(12) United States Patent
Khasnis et al.

(10) Patent No.: US 8,615,518 B2
(45) Date of Patent: Dec. 24, 2013

(54) REAL TIME ASSOCIATION OF RELATED BREAKING NEWS STORIES ACROSS DIFFERENT CONTENT PROVIDERS

(75) Inventors: Abhijit Khasnis, Bangalore (IN); Subramanian Narayanan, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 304 days.

(21) Appl. No.: 13/084,352

(22) Filed: Apr. 11, 2011

(65) Prior Publication Data

US 2012/0259853 A1 Oct. 11, 2012

(51) Int. Cl.
G06F 7/00 (2006.01)
G06F 17/00 (2006.01)

(52) U.S. Cl.
USPC .......................................................... 707/738

(58) Field of Classification Search
None
See application file for complete search history.

(56) References Cited

U.S. PATENT DOCUMENTS

| | | | | |
|---|---|---|---|---|
| 7,293,019 B2* | 11/2007 | Dumais et al. | ................. | 707/754 |
| 8,126,865 B1* | 2/2012 | Bharat et al. | ................. | 707/706 |
| 8,239,397 B2* | 8/2012 | Stefik et al. | ................... | 707/758 |
| 8,332,399 B1* | 12/2012 | Osinga | .......................... | 707/730 |
| 2005/0165743 A1* | 7/2005 | Bharat et al. | ................. | 707/3 |
| 2005/0198056 A1* | 9/2005 | Dumais et al. | ................. | 707/101 |
| 2006/0242158 A1 | 10/2006 | Ursitti et al. | | |
| 2007/0260586 A1* | 11/2007 | Savona et al. | ...................... | 707/3 |
| 2008/0092077 A1* | 4/2008 | Mather et al. | ................. | 715/781 |
| 2009/0048927 A1* | 2/2009 | Gross | .............................. | 705/14 |
| 2009/0048928 A1* | 2/2009 | Gross | .............................. | 705/14 |
| 2009/0048990 A1* | 2/2009 | Gross | .............................. | 706/12 |
| 2009/0049017 A1* | 2/2009 | Gross | .............................. | 707/3 |
| 2009/0049018 A1* | 2/2009 | Gross | .............................. | 707/3 |
| 2009/0049037 A1* | 2/2009 | Gross | .............................. | 707/5 |
| 2009/0049038 A1* | 2/2009 | Gross | .............................. | 707/5 |
| 2009/0055359 A1* | 2/2009 | Gross | .............................. | 707/3 |
| 2009/0063469 A1* | 3/2009 | Gross | .............................. | 707/5 |
| 2009/0064247 A1* | 3/2009 | Biniak et al. | .................. | 725/105 |
| 2009/0070346 A1* | 3/2009 | Savona et al. | ................. | 707/100 |
| 2010/0191741 A1 | 7/2010 | Stefik et al. | | |
| 2011/0047148 A1* | 2/2011 | Omoigui | ....................... | 707/723 |
| 2012/0254188 A1* | 10/2012 | Koperski et al. | .............. | 707/740 |

FOREIGN PATENT DOCUMENTS

KR 10-2009-0003066 A 1/2009

OTHER PUBLICATIONS

PCT International Search Report—PCT/US2012/030206 (dated Sep. 28, 2012) (3 pages).

* cited by examiner

*Primary Examiner* — Jeffrey A Burke
(74) *Attorney, Agent, or Firm* — Martine Penilla Group, LLP (57) ABSTRACT

Methods and systems for relating breaking news stories across content providers include receiving a breaking news headline for a breaking news from a content provider. The breaking news headline is tokenized in substantial real time by identifying a plurality of headline tokens. A plurality of news stories is received from a plurality of content providers. Each of the plurality of news stories is tokenized to identify a plurality of story tokens. The plurality of headline tokens and story tokens are analyzed to determine if one or more of the news stories are related to the breaking news headline. Based on the analysis, one or more of the news stories are mapped to the breaking news headline. The mapping enables presentation of the one or more news stories from one or more of the content providers while rendering the breaking news headline.

17 Claims, 9 Drawing Sheets

Entry in Hash Table associated with Breaking News Headline

| Record Key | Link(s) | Time Lapse from Breaking News Headline |
|---|---|---|
| B1 |  | T0 |
| B1 | UUID(AP1) | T0 + 2.2 |
| B1 | UUID(AP1), UUID(R1) | T0 + 2.5 |
| AP1 | UUID(R1) | T0 + 2.5 |
| R1 | UUID(AP1) | T0 + 2.5 |
| B1 | UUID(AP1), UUID(R1), UUID(AP2) | T0 + 3.5 |
| AP1 | UUID(R1), UUID(AP2) | T0 + 3.5 |
| R1 | UUID(AP1), UUID(AP2) | T0 + 3.5 |
| AP2 | UUID(AP1), UUID(R1) | T0 + 3.5 |

Figure 7A

Entry in Hash Table associated with Breaking News Headlines

| Record Key | Link(s) | Time Lapse from Breaking News Headline |
|---|---|---|
| B1 | | T0 |
| B1 | UUID(AP 1) | T0 + 2.2 |
| B1 | UUID(AP 1), UUID(BB 1) | T0 + 2.5 |
| AP 1 | UUID(BB 1) | T0 + 2.5 |
| BB 1 | UUID(AP 1) | T0 + 2.5 |
| New Breaking New Headline detected - Initialize key | Initialize links | Initialize time |
| B2 | | T1 |
| | News story AP 2 flushed and not considered for reporting since new breaking story was detected | T1 + 0.75 |
| B2 | UUID(R 2) | T1 + 1.5 |
| B2 | UUID(R 2), UUID(MM 1) | T1 + 3.5 |
| R 2 | UUID(MM 1) | T1 + 3.5 |
| MM 1 | UUID(R 2) | T1 + 3.5 |
| B2 | UUID(R 2), UUID(MM 1), UUID(BBC 1) | T1 + 4.25 |
| R 2 | UUID(MM 1), UUID(BBC 1) | T1 + 4.25 |
| MM 1 | UUID(R 2), UUID(BBC 1) | T1 + 4.25 |
| BBC 1 | UUID(R 2), UUID(MM 1) | T1 + 4.25 |

REAL TIME ASSOCIATION OF RELATED BREAKING NEWS STORIES ACROSS DIFFERENT CONTENT PROVIDERS

BACKGROUND

1. Field of the Invention

The present invention relates to timely provisioning of information related to breaking news, and more particularly, to associating related breaking news headline with news stories from different content providers.

2. Description of the Related Art

With the meteoric rise in popularity of the internet, vast amounts of information are available on the internet. In fact, users rely on the internet as a preferred source for obtaining information on breaking news. Breaking news relate to brief information about events that are currently happening. Online news service providers receive the breaking news from a plurality of content providers and present the breaking news as and when they are received from the content providers. In a rush to be the first to provide the information on the breaking news, the content providers usually provide the breaking news headlines as news flash or news "slug" and follow it up with additional information on the breaking news. When the service providers receive the breaking news flash and related news stories from a plurality of content providers, they aggregate the breaking news headlines and the related information on the breaking news from the same content provider and present the breaking news to the users on a first come first served basis.

With the drive to provide the information faster to the users, the content providers may, however, provide information that may be incomplete, lack sufficient data/depth or may include factual errors. The service providers currently do not have the ability to inter-relate information obtained from other content provider sources with the breaking news headline from a particular content provider. Lack of sufficient depth/data or incomplete information may result in driving away the users from the service provider's website. It would be advantageous if the service providers have the ability to inter-relate breaking news with news stories from various content providers so as to keep the users engaged with quality news stories.

It is in this context that the embodiments of the invention arise.

SUMMARY

Embodiments of the present invention describe methods and apparatus for relating breaking news headline with a plurality of news stories in a manner that enables inter-relation of content from a plurality of content providers with the breaking news headline provided by a particular content provider. The breaking news headline for a breaking news is received from a particular content provider. Upon receipt, the breaking news headline is dynamically tokenized to identify a plurality of headline tokens that substantially describe the breaking news headline. A plurality of news stories are received from a plurality of content providers. The content provider that provides one or more of the news stories may be the same as the one that provides the breaking news headline or may be distinct. Upon receipt, each of the news stories is tokenized in substantial real time to identify a plurality of story tokens. The headline tokens and story tokens are analyzed to determine if one or more of the plurality of news stories are related to the breaking news headline. When one or more of the news stories are found to be related to the breaking news headline, the related news stories are mapped to the breaking news headline in substantial real time so that the related news stories may be presented to a user with the breaking news headline. The presented information is not restricted to information from a single content provider that provides the breaking news headline but includes news stories from a plurality of content providers. The presented information enables a user to get a complete picture of the developing story related to the breaking news headline thereby keeping the user engaged in the service providers website.

Conventional applications used costly algorithm to identify news stories that relate to the breaking news headline by matching content of the news stories with the subject of the headline. This type of matching is time intensive unnecessarily adding to the overhead. Instead, the embodiments of the invention use tokens that substantially describe the headline and the news stories to find a match, resulting in less overhead while providing efficient results. Further, the current invention allows for a faster turnaround time in publishing the news stories by dynamically tokenizing, matching and presenting the matched news stories for the breaking news headline in substantial real time.

It should be appreciated that the present invention can be implemented in numerous ways, such as, methods, systems and an apparatus. Several inventive embodiments of the present invention are described below.

In one embodiment, a method for relating breaking news stories across content providers is disclosed. The method includes receiving a breaking news headline for a breaking news from a content provider. The breaking news headline is tokenized in substantial real time by identifying a plurality of headline tokens. A plurality of news stories is received from a plurality of content providers. Each of the plurality of news stories is tokenized to identify a plurality of story tokens. The plurality of headline tokens and story tokens are analyzed to determine if one or more of the news stories are related to the breaking news headline. Based on the analysis, one or more of the news stories is mapped to the breaking news headline. The mapping enables presentation of the one or more news stories from one or more of the content providers with the breaking news headline.

In another embodiment, a computer program embedded in a non-transitory computer-readable storage medium configured to be executed by one or more processors, for relating breaking news stories across content providers is disclosed. The computer program includes program instructions for receiving a breaking news headline for a breaking news from a content provider. The computer program further includes program instructions for tokenizing the breaking news headline in substantial real time by identifying a plurality of headline tokens. The computer program includes program instructions for receiving news stories from a plurality of content providers and for tokenizing each of the news stories in substantial real time to identify a plurality of story tokens. The plurality of headline tokens and the plurality of story tokens are analyzed by the computer program to determine if one or more of the news stories are related to the breaking news headline. Based on the analysis, the computer program maps the one or more of the news stories from one or more of the content providers to the breaking news headline received from a particular content provider so that the related news stories can be presented for the breaking news headline during rendition of the breaking news headline.

The embodiments of the invention provide an efficient tool that allows news stories from a plurality of content providers to be mapped to the breaking news headline so that the news stories from the plurality of content providers can be presented during the rendition of the breaking news headline. The computer program uses less overhead while providing more depth and broader perspective to the breaking news headline.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and computer algorithm within a computer readable medium for relating breaking news headline received from a particular content provider to news stories received from a plurality of content providers. The breaking news headline and the news stories are dynamically tokenized and the tokens are analyzed in substantial real-time to determine which of the news stories relate to the breaking news headline. The related news stories are mapped to the breaking news headline in substantial real-time so that the news stories may be presented under the breaking news headline when rendered by a service provider. The related news stories may be from a different content provider than the one providing the breaking news headline or may be from the same content provider.

The computer algorithm addresses some of the drawbacks of the conventional application tools. The conventional application tools are able to relate breaking news headline from a specific content provider with news stories received from the same content provider. This results in a user obtaining a single perspective for any breaking news limiting the user's experience. Additionally, the conventional application matches the news stories by comparing the content of the news story to determine if the content matches the breaking news. Such matching results in unnecessary overhead leading to delay in presenting information about the breaking news to the user. In the age of instant information gratification, such delay will be very costly to a service provider as it may result in the user moving away from the service provider's website. The algorithm of the invention, on the other hand, provides an efficient way to relate news stories from different content providers to the breaking news headline so as to enable a user to obtain multiple and broader perspectives of the breaking news headline. Also, as the algorithm uses tokens to match the news stories to the breaking news headline, the algorithm uses less overhead and is able to provide the results faster and in a more complete way enriching the users experience thereby increasing traffic to the service provider's website. Other advantages will become apparent from the following detailed description of the various embodiments.

Figure 1:
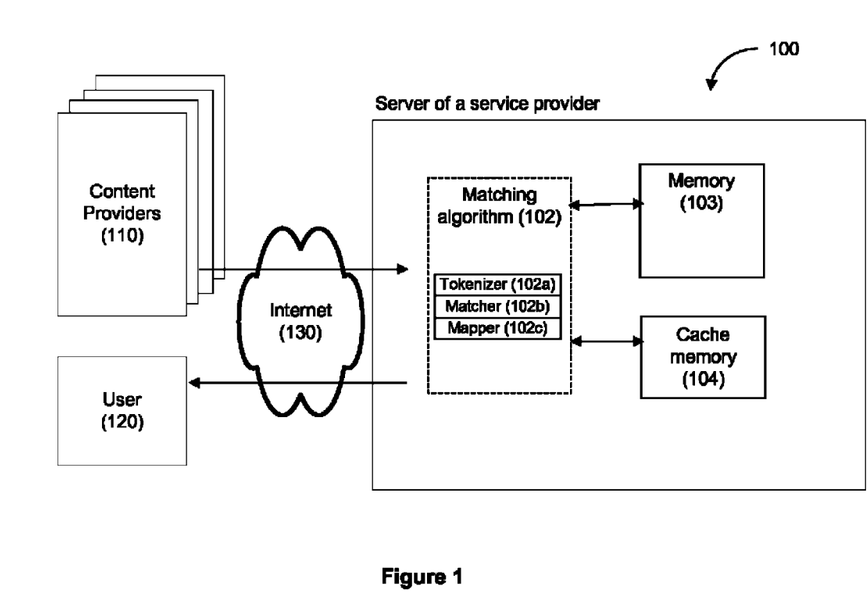
FIG. 1 illustrates a simplified block diagram of a system used in matching tokens related to news stories with tokens related to breaking news headline, in one embodiment of the invention.

With the general understanding of the invention, specific embodiments will now be discussed with reference to the attached drawings. FIG. 1 illustrates a system for relating news stories from different content providers to a breaking news headline, in one embodiment of the invention. An algorithm, such as matching algorithm 102, available on a server 100 of a service provider receives the breaking news headline for a breaking news event and news stories from a plurality of content providers 110 over the internet 130. The matching algorithm 102 interacts with a memory module 103 and a cache memory 104 available on the server 100 during processing of the breaking news headline and news stories. The cache memory 104 is used in storing the breaking news headline and the news stories for quick retrieval. The memory module 103 is used during processing. The matching algorithm includes program instructions configured to receive breaking news from a content provider and identify news stories received from various content providers that relate to the breaking news. The related news stories are mapped to the breaking news in substantial real-time so that when the breaking news are rendered, the related news stories are rendered alongside the breaking news for the user to access and view. In one embodiment, one or more of the related news stories may be provided as additional links.

To assist in matching related news stories to the breaking news headline, The algorithm of the invention may include a plurality of modules, such as tokenizer 102a, matcher 102b, mapper 102c, that includes logic to receive and process the news stories and the breaking news headline. The tokenizer 102a is configured to receive the breaking news headline from a content provider and tokenize the breaking news headline to identify a plurality of headline tokens in substantial real time. The tokenizer 102a interacts with the cache memory 104 to store the breaking news headline and the corresponding headline tokens in the cache memory 104 for subsequent retrieval. The tokenizer 102a is also configured to receive news stories from a plurality of content providers. As and when a news story is received from a content provider, the tokenizer 102a tokenizes the news story in substantial real time to identify a plurality of story tokens. The tokenizer 102a to stores the news story and the corresponding story tokens for subsequent retrieval. The matcher module 102b is configured to retrieve the headline tokens and the story tokens of the news story from the cache memory 104 and analyze the headline and story tokens to determine if the news story is related to the breaking news headline based on a pre-defined matching criteria available in the matching algorithm. The matching criteria may specify the percentage of matching that may be required in order for the matcher module 102b to declare that the news story is related to the breaking news headline.

Upon finding a match, the mapper module 102c to link the related news story to the breaking news headline. The link may be by tagging the breaking news headline with an identifier associated with the news story, such as a universally unique identifier (UUID). The link establishes the relationship between the breaking news headline the related news story. If more than one news story matches to the breaking news headline, then the mapper module 102c will not only tag the breaking news headline with the identifiers associated with the related news stories but will also tag each of the related news stories with the identifiers of the remaining news stories that are related to the breaking news headline. The breaking news headline and the related news stories identified by the link are then returned to a client user 120 in substantial real time for rendering.

Figure 2:
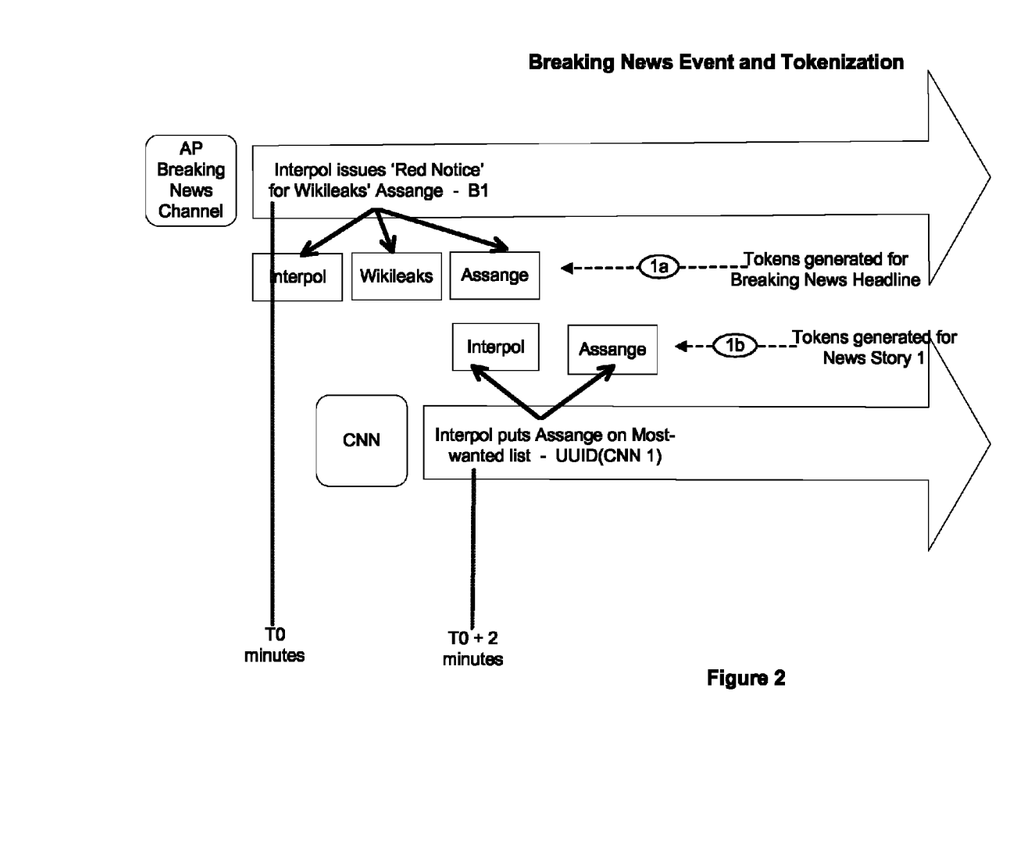
FIG. 2 illustrates a simplified block diagram of a breaking news event and tokenization associated with a breaking news headline and a news story, in one embodiment of the invention.

FIG. 2 illustrates a simplified block diagram of tokenizing breaking news event, in one embodiment of the invention. As mentioned earlier, in response to a breaking news event, a particular content provider may provide information on breaking news to a service provider in the form of a news flash or a news "slug." The news flash/news slug is a brief and usually a single line of information that substantially describes the breaking news. For instance, in the embodiment illustrated in FIG. 2, the content provider, such as "Associated Press" (AP), provides the news flash in the form of a breaking news headline—"Interpol issues 'Red Notice' for Wikipedia's Assange," B1. In one embodiment, the content provider may use a specific channel, such as the AP Breaking News Channel, associated with the content provider for providing only the news flash (otherwise termed, 'headline' or a 'news slug') and use different channels to provide the news stories to a service provider. An algorithm available on a server of the service provider will detect the headline as and when it is received from the particular content provider and tokenize the headline in substantial real time by identifying a plurality of headline tokens. In addition to detecting the headline, the algorithm may record the time period when the breaking news headline was received from the content provider. For instance, time 'T0' minutes may be recorded as the time period when the breaking news headline (or simply 'headline') was received at the server. During tokenization, the algorithm identifies keywords from the headline that substantially describe the headline. The identified keywords define tokens for the headline. For instance, for the breaking news headline identified in FIG. 2, the algorithm may identify the following headline tokens—"Interpol," "Wikileaks," and "Assange," as illustrated by bubble '1a'. The headline tokens may be stored in the cache memory along with the breaking news headline for subsequent retrieval.

In one embodiment, subsequent to receiving and tokenizing the breaking news headline, the algorithm detects a news story, such as 'CNN 1,' received from a content provider, such as Cable News Network (CNN). In addition to detecting the news story, the algorithm may also record the time period when the news story was received from the content provider in relation to the breaking news headline. For instance, the news story, CNN 1, was detected to have been received from the content provider at about T0+2 minutes in relation to the receipt of the breaking news headline. The news story CNN 1 includes a title that describes the content, such as, 'Interpol puts Assange on Most-wanted list.' The algorithm parses the title of the news story and tokenizes the news story by identifying a plurality of story tokens that substantially describes the news story, as illustrated by bubble '1b'. The tokenization of the news story and the headline are done in substantial real time as and when the news story and headline are received from the respective content providers. For the above example of the news story, the story tokens generated after parsing the title of the news story may include, 'Interpol,' and 'Assange,' that substantially describe the content of the news story received from the content provider. It should be noted herein that the content provider that provides the news story (CNN) may be different from the content provider that provides the breaking news headline (Associated Press (AP)) or may be the same as the one providing the breaking news headline. It should also be noted herein that the content provider that provides the news story may also provide additional news stories that relate to the breaking news headline. In addition to the story tokens, the algorithm may generate a Universally unique Identifier (UUID) for the each of the news story received from content providers, such as UUID (CNN 1), etc.

Figure 3:
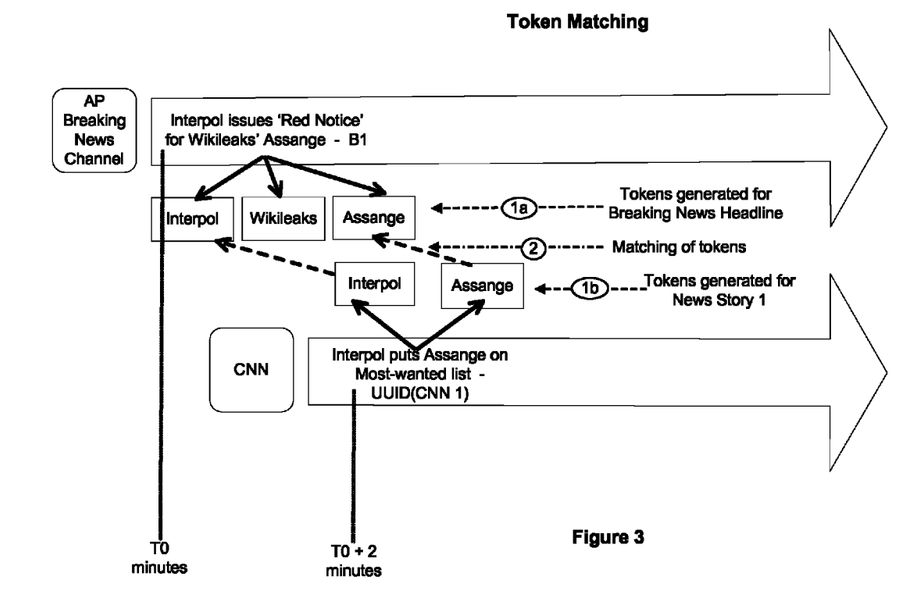
FIG. 3 illustrates an simplified block diagram of token matching, in one embodiment of the invention.

Upon completing the tokenization of the breaking news headline and the news story, the algorithm performs token matching, as illustrated in FIG. 3. In this stage, the algorithm retrieves the headline tokens for the breaking news headline from the memory cache where they are stored and compares each of the plurality of headline tokens with each of the plurality of story tokens associated with the news story to determine if the headline and story tokens match and the degree of match. Using the example illustrated in FIG. 2, the algorithm determines that two ('Interpol' and 'Assange') out of the three tokens ('Interpol', 'Wikileak' and 'Assange') of the breaking news headline match both the tokens generated for the news story, as illustrated by bubble '2'. It should be noted herein that the example illustrated in FIG. 2 identifying a single news story is simplified for illustrative purposes and should be considered exemplary and not restrictive. As a result, the algorithm may detect a plurality of news stories transmitted by plurality of content providers over time, tokenize each of the news stories by parsing the respective titles to generate a plurality of story tokens and use the generated story tokens for matching with the headline tokens associated with the breaking news headline.

In one embodiment, a pre-defined matching criteria is used during the matching of tokens so as to determine a level of matching of a particular news story with the breaking news headline. In one embodiment, the pre-defined matching criteria may indicate the number or percentage of headline and story tokens that need to match in order to declare that a particular news story is related to the breaking news headline. In one embodiment, the matching criteria may match the news stories to the breaking news headline based only on the percentage/number of respective token matches but may use other attributes associated with the breaking news headlines and news stories to rank and prioritize the news stories with respect to the breaking news headlines. For instance, in addition to the number/percentage of token matches to identify the relevant news stories, the matching criteria may include a staleness factor for considering ranking the news stories to a particular breaking news headline. The staleness factor, in one embodiment, may specify a lapse of time between when the breaking news headline is received to the time when the news story is received for matching/mapping. As the breaking news events capture stories that are of importance and fast evolving, the staleness factor will enable the algorithm to identify news stories that are relevant, fresh and provide broader perspective. Thus, during matching of a news story to the breaking news headline, in addition to matching the story tokens to the headline tokens, the algorithm may check the staleness factor of each news story to dynamically rank and prioritize the news story in relation to other news stories with the oldest news story being given less weight and the newest news story being given more weight, in one embodiment. This would result in presentation of related news stories in the order of relevance and freshness to the breaking news headline. It should be noted that the staleness factor is one attribute of the news story that is used in ranking and prioritizing the news stories to the appropriate breaking news headlines. In addition to the staleness factor, the news stories may be ranked and prioritized based on the relevancy of the content provider. The relevancy of a particular content provider may be determined by capturing user interactions at the one or more news stories provided by the particular content provider in relation to user interactions at the other news stories provided by other content providers.

In addition to the staleness factor, the matching criteria may include a time frame for mining and reporting the news stories for a related breaking news headlines. Due to the limited resources of cache memory where the breaking news headlines and related news stories are stored for fast retrieval, and due to the urgency of reporting the breaking news headlines in a timely manner, the time frame may be kept sufficiently short so that the news stories that have been received within the time frame are processed and reported in a timely manner for the breaking news headlines while making room for storing other breaking news headlines related information so that the resources of the cache memory may be efficiently used for storing other breaking news headlines.

As and when the news stories are received, the algorithm dynamically tokenizes the news stories, retrieves the headline tokens from memory cache and matches the story tokens to the headline tokens using the matching criteria so as to determine which news stories are related to the headline. The story tokens of the related news stories are stored in the memory cache along with the news stories for subsequent retrieval. Upon determining related news stories, the algorithm, in one embodiment, ranks and prioritizes the related news stories based on the percentage/level of match so as to present them with the headline in an order of relevance. In one embodiment, the various related news stories are presented as links under the headline. If two news stories have the same level of match to the headline, then the algorithm will rank and prioritize based on the time period when the two news stories were received from the respective content providers (i.e. staleness factor). The algorithm thus provides the most relevant news stories received from various content providers to the headline in substantial real-time.

Figure 4:
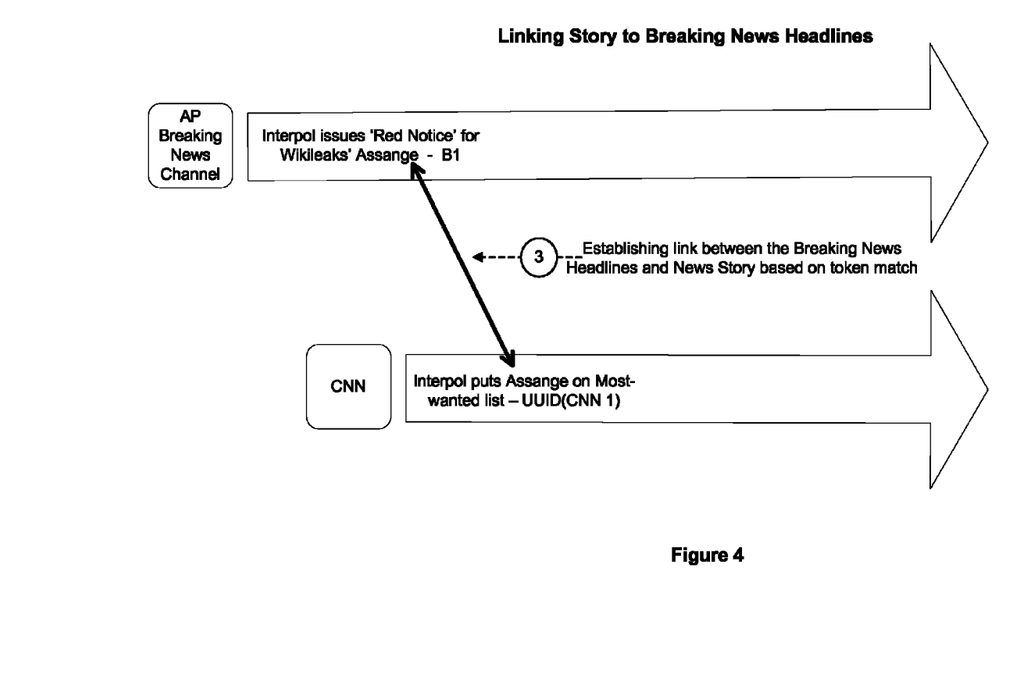
FIG. 4 illustrates a simplified block diagram of linking the breaking news headline with a related news story, in one embodiment of the invention.

Upon identifying the related news stories for the headline, the news stories are linked to the headline so that they can be presented with the headline to the user. FIG. 4 illustrates the linking of the news stories to the breaking news headline, in one exemplary embodiment of the invention. As illustrated, upon determining the story tokens associated with the news story CNN 1 matches with the headline tokens associated with the breaking news headline B1, a link is established for the matching news story in the headline. The link establishes the relationship between the breaking news headline and the news story. In one embodiment, the link is established by tagging the breaking news headline with an identifier associated with the news story, such as UUID (CNN 1). The breaking news headline and the related news story identified by the link are presented to the user in substantial real time. The link is also stored in the cache memory along with the breaking news headline, headline tokens, the news story and the story tokens for subsequent retrieval.

The cache memory allows for quick retrieval of the data contained therein. Thus, as and when a news story is received from a content provider, the news story is tokenized, headline tokens are retrieved from the cache memory, the headline tokens and story tokens are analyzed to determine if there is a match. When a match is established, the news story is linked to the headline based on the level of match. Then the news story, story tokens and the link are stored in the cache memory so that the relevant news stories and the breaking news headline can be quickly retrieved for presenting to the user when requested. If the news story is not related to the current breaking news headline, the tokens and the news story are stored away in the cache memory for subsequent mining in relation to other breaking news headline that may be received subsequently. Thus, when a subsequent new breaking news headline is received, the story token of the news story that is already in cache memory is compared with the headline tokens of the new breaking news story and presented to the user when a match is found.

Figure 5:
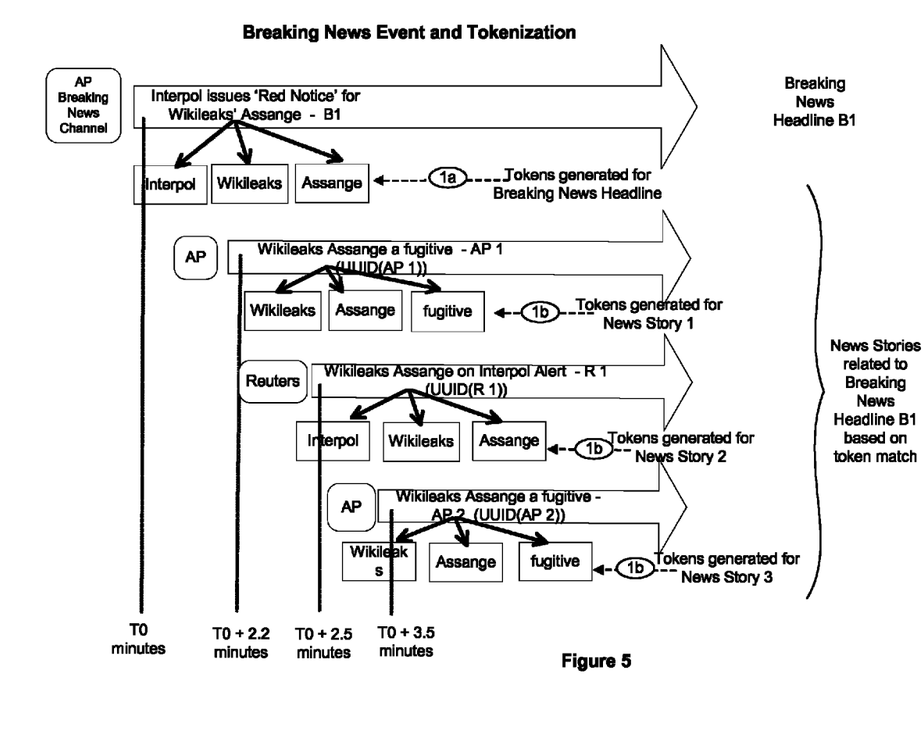
FIG. 5 illustrates a simplified block diagram of a breaking news event and tokenization associated with a breaking news headline and a plurality of news stories, in one embodiment of the invention.

FIG. 5 illustrates a more detailed depiction of the breaking news event and tokenization, in one embodiment of the invention. As depicted, a breaking news headline is received from a content provider and a plurality of news stories are received subsequent to the receipt of the breaking news headline. The algorithm will detect the breaking news headline as soon as it is received from a content provider and dynamically generate headline tokens using keywords available in the headline. In the example illustrated in FIG. 5, the breaking news headline B1 is received from content provider 'AP' at time T0 and headline tokens, 'Interpol', 'Wikileaks' and 'Assange' are generated for the headline by the algorithm at about time T0, as illustrate by bubble '1a'. The headline and the headline tokens are maintained in a temporary cache memory of the server computing device associated with the service provider where the algorithm is executing. A plurality of news stories, news story 1, 2, 3, etc., are received from content providers subsequent to receiving the headline. The news stories are received from different content providers with each content provider providing one or more news stories. In the example illustrated in FIG. 5, news story 1 was received from the content provider 'AP' at time T0+2.2 minutes, news story 2 was received from content provider 'Reuters' at time T0+2.5 minutes, news story 3 was received from content provider 'AP' at time T0+3.5 minutes, and so on. As can be seen, the content provider that provided the headline is the same as the content provider that provided news story 1 and news story 3. The algorithm detects the news story as it arrives from the content provider and tokenizes the news story to generate story tokens in substantial real time, as illustrated by bubble '1b'. Thus, the algorithm would generate story tokens, 'Wikileaks', 'Assange' and 'fugitive' from news story 1 at about time T0+2.2 minutes, story tokens, 'Interpol', 'Wikileaks' and 'Assange' from news story 2 at about time T0+2.5 minutes and story tokens, 'Wikileaks', 'Assange' and 'fugitive' from news story 3 at about time T0+3.5 minutes where T0 is the time that the breaking news headline currently stored in cache memory was received. Each of the news stories, irrespective of which content provider provided the content, is stored distinctly in the temporary cache memory as and when it is received along with a unique user identifier and corresponding story tokens.

As and when a news story is received, the algorithm will generate the story tokens for the newly received news story. The algorithm then extracts the headline tokens from the memory cache, analyze the headline tokens and the newly generated story tokens of the news story to determine if there is a match and the level of match. Based on the analysis, the news story may be identified as related to the breaking news headline and a link is established between the breaking news headline and the news story by tagging the breaking news headline with the identifier associated with the newly arrived news story. The link enables the news story to be presented to the user alongside the breaking news headline.

Figure 6:
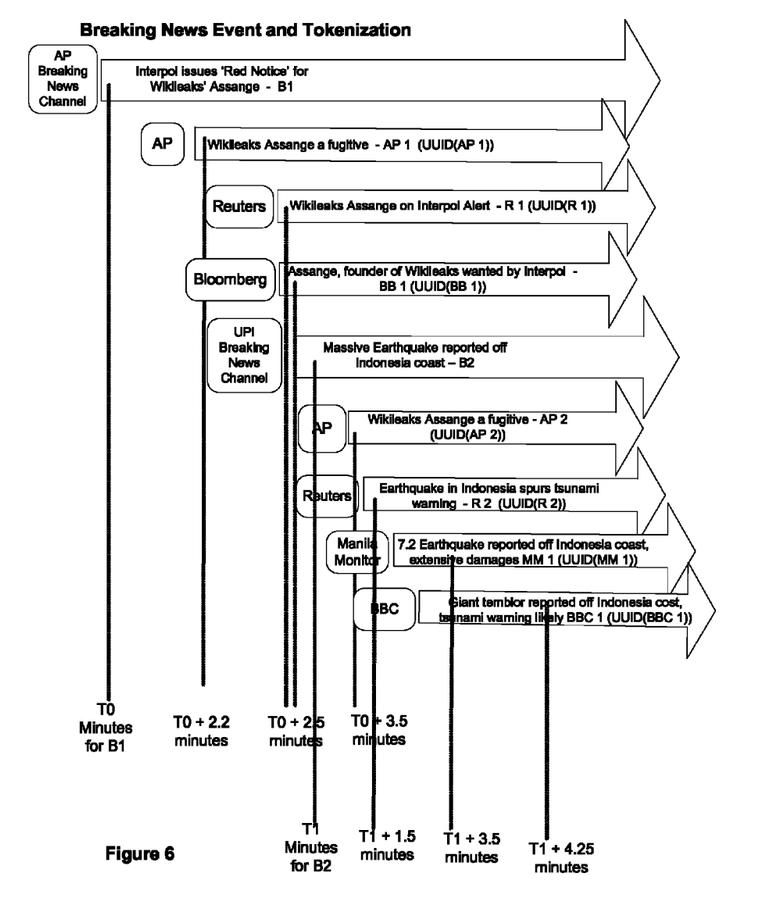
FIG. 6 illustrates a simplified block diagram of a breaking news event identification and tokenization associated with a plurality of breaking news headlines and a plurality of news stories, in one embodiment of the invention.

FIG. 6 illustrates an alternate embodiment of the breaking news event and tokenization illustrated in FIG. 5. In this embodiment, after receiving a first breaking news headline B1 from a content provider (AP) at time T0 minutes and a plurality of news stories (R1, BB 1) from different content providers at time T0+2.2 minutes and T0+2.5 minutes, the algorithm detects a second breaking news headline B2 provided by a content provider. The second breaking news may be from the same content provider as the one providing the first breaking news B1 or may be from a different content provider. In the embodiment illustrated in FIG. 6, the second breaking news headline is provided by a different content provider (UPI). Upon detecting the second breaking news headline B2 received from a content provider at time T1 minutes, the algorithm first initializes information related to the breaking news headline B1 stored in the memory cache including initializing breaking news headline B1, any links established to the news stories, the headline tokens, news stories, and related story tokens associated with the first breaking news headline B1. The algorithm then tokenizes the second breaking news headline B2 similar to the way the first breaking news headline B1 was tokenized by identifying a plurality of keywords that substantially describe the second breaking news headline B2. The identified keywords define the headline tokens for the second breaking news headline B2. The second breaking news headline B2 is stored in the memory cache along with the corresponding headline tokens. In addition to the breaking news headlines and the corresponding headline tokens, the algorithm may also store other attributes, such as time period when the breaking news headline B2 was received, etc., associated with the breaking news headlines B2, in the memory cache. The time period when the second breaking news headline is received is used to define staleness factor for the news stories that are related to the second breaking news headline.

In one embodiment, subsequent to receiving the second breaking news headline B2 at time T1, a plurality of news stories are received from a plurality of content providers over a period of time. As illustrated in FIG. 6, for instance, a news story AP 2 is received from Associated Press (AP) at T1+0.75 minutes, news story R 2 is received from Reuters at T1+1.5 minutes, news story MM 1 is received from Manila Monitor at T1+3.5 minutes and BBC 1 is received from British Broadcasting Corporation (BBC) at T1+4.25 minutes. As each of the news stories is received from the respective content providers, the algorithm tokenizes the news stories to identify story tokens. The headline tokens are then retrieved from the memory cache and the headline tokens and story tokens are analyzed to determine relationship of the news story to the breaking news headline. From the analysis it is determined that the news story AP 2 does not relate to the second breaking news headline but relates to either the first breaking news headline or a new breaking news headline that is similar to the first breaking news headline. Since the news story was received after the second breaking news headline was received and after the memory cache was initialized wherein the first breaking news headline and any data related to the first breaking news headline was flushed out of the memory cache, the news story AP 2 and the story tokens related to this news story are saved in the cache memory for subsequent mining. The analysis ensures that only the most recent breaking news and news stories are maintained in the memory cache so that the users can be presented with the relevant information on the breaking news. Through the analysis, it is noted that the subsequent news stories that are received are related to the second breaking news headline. As mentioned earlier, as part of determining the relationship of the news stories to the breaking news headline, the algorithm also ranks and prioritizes the related news stories based on the level of matching of the story tokens to the headline tokens and staleness factor. The ranking of the news stories in relation to the breaking news headlines is dynamically adjusted in the memory cache so as to present the most relevant news stories under the breaking news headline for the user in the order of relevance.

In one embodiment, one or more news story for the second breaking news headline may already have been received prior to the receipt of the second breaking news headline. It should be noted herein that when the algorithm initializes the cache memory, the algorithm initializes only the data related to the first breaking news headline. As a result, the one or more news stories that were not related to the first breaking news headline and the related news tokens are still in the cache memory and are now used in matching with the headline tokens of the second or subsequent breaking news headline. Thus, the algorithm continuously clears the cache memory of the breaking news headline and information related to the breaking news headline that are already reported/presented to the users and maintains news stories that have not yet been reported so that they can be mined for subsequent reporting.

In one embodiment, the same subject matter that was reported in a first breaking news headlines may be received and reported as subsequent breaking news headlines. This can happen in cases where the breaking news headlines are related to developing stories that span over an extended period of time. In this embodiment, the newer breaking news headlines related to the same subject matter are received, tokenized and presented to the users with latest related news stories. Since the cache memory is initialized every time a newer breaking news headlines is received, the first breaking news headlines and the related news stories are flushed from the cache memory and the second breaking news headlines with the latest related news are tokenized, reported and stored in the cache memory till a subsequent breaking news headlines is received. This constant initialization of cache memory helps in managing the limited resources of the cache memory well while providing relevant news stories in a fast and efficient manner.

Figure 7A:
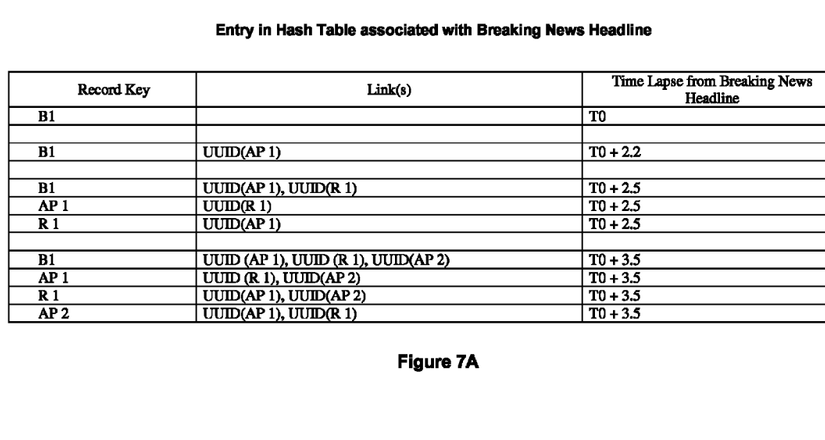
FIG. 7A illustrates a simplified hash table identifying the mapping of the breaking news event to a plurality of news stories, in one embodiment of the invention.
Figure 7B:
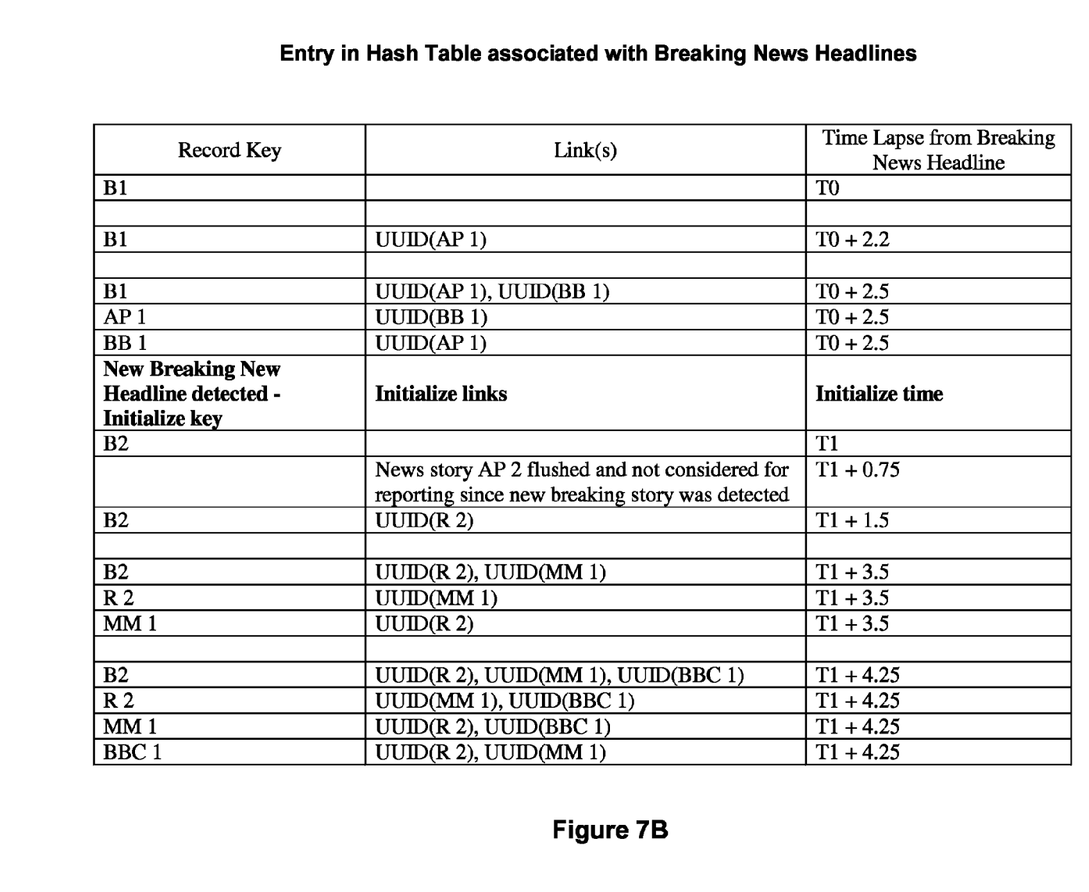
FIG. 7B illustrates a simplified hash table identifying the mapping of the breaking news events to plurality of news stories, in an alternate embodiment of the invention.

The linking of the news stories to the breaking news headline using a hash table are illustrated in FIGS. 7A and 7B, respectively. As illustrated in FIG. 7A, a hash table is presented identifying all the links established amongst the various news stories and with the breaking news headline for the example illustrated in FIG. 5. In the embodiment illustrated in FIG. 7A, only one breaking news headline is received and a plurality of news stories that are related to the breaking news headline are linked to the breaking news headline and with each other using the respective news story identifiers. This inter-relationship of linking the news stories to not only the breaking news headline but to each other enables for efficient and faster identification of the relevant news stories for rendering with the breaking news headline. If a large number of related news stories exceeds a certain pre-determined number, then the related news stories that are ranked below the pre-determined number are not presented with the breaking news headline, in one embodiment. If another embodiment, when the number of related news stories exceed the pre-determined number, the news stories are provided as links under the breaking news headline so that the user can still access the news stories to get a much broader perception of the headline. As can be seen from the hash table in FIG. 7A, each of the news stories are linked to the breaking news headline and with each other using the universally unique identifier (UUID).

FIG. 7B illustrates a hash table that identifies all the links established amongst the various news stories and with the breaking news headline described with reference to FIG. 6. In this embodiment, two breaking news headlines are received from different content providers over a period of time. When a second breaking news headline is received, the headline tokens related to the first breaking news headline, the news stories related to the first breaking news headline, the corresponding story tokens and other attributes of the first headline and news stories are initialized (i.e. flushed out) in the memory cache so as to make room for storing information related to the second breaking news headline and the news stories received subsequent to receiving the second breaking news headline so that the relevant information may be quickly retrieved for analysis and presentation.

Figure 8:
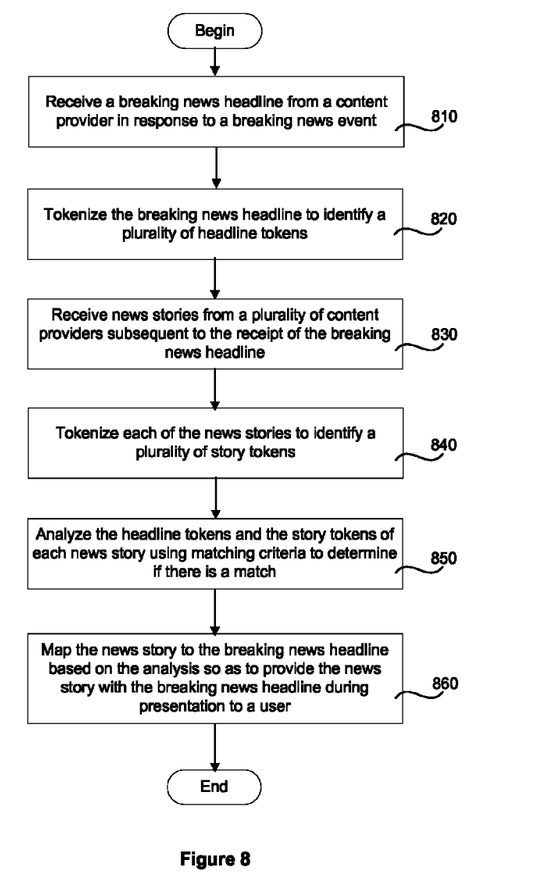
FIG. 8 illustrates a flow chart of operations used in relating breaking news stories across content providers, in one embodiment of the invention.

FIG. 8 illustrates a flow chart of operations in relating news stories received from a plurality of content providers to a breaking news headline, in one embodiment of the invention. The process begins when a breaking news headline is received from a content provider in response to a breaking news event, as illustrated in operation 810. The breaking news headline may be received from a particular channel of the content provider that is specifically reserved for providing such breaking news headline. In response to receiving the breaking news headline, an algorithm parses the breaking news headline in substantial real time to identify a plurality of keywords that substantially describe the headline, as illustrated in operation 820. The keywords define the headline tokens for the breaking news headline. The headline and the headline tokens are stored in a temporary memory cache for quick retrieval. News stories from a plurality of content providers are received following the receipt of the breaking news headline over time, as illustrated in operation 830. The content providers providing one or more of the news stories may be the same as the content providers providing the breaking news headline or they may be different. As and when a news story is received, the algorithm parses the news story to identify a plurality of story tokens that substantially describes the news story, as illustrated in operation 840. The algorithm then retrieves the headline tokens of the breaking news headline from the memory cache and analyzes the headline tokens and the story tokens to determine if the news story is related to the breaking news headline based on matching criteria, as illustrated in operation 850. A link is established between the news story and the breaking news headline in substantial real time, based on the analysis, as illustrated in operation 860. The link may be established by tagging the breaking news headline with an identifier associated with the news story so that when the breaking news headline is presented to a user, the related news story/stories is also presented alongside the breaking news headline. The process continues so long as the news stories are received within a time frame when the news stories are reported/presented to the users or so long as there are no other breaking news events occurring.

It should be noted that the various embodiments provide a means to relate and present news stories from various content providers for a breaking news headline in substantial real time by matching tokens instead of content. This results in faster and efficient way of relating the news stories to the breaking news. Using the aforementioned algorithm, an accuracy rate of over 90% is achieved while maintaining a high quality of matching. The algorithm uses less overhead while meeting the standards required for quality, such as a service level agreement standard. Other advantages of the algorithm may be easily envisioned by one skilled in the art.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for relating breaking news stories across content providers, comprising:
   receiving a breaking news headline for a breaking news from a content provider;
   tokenizing the breaking news headline to identify a plurality of headline tokens;
   receiving news stories from a plurality of content providers;
   processing a title of each of the news stories to produce a plurality of story tokens;

maintaining the plurality of headline tokens and the plurality of story tokens in a cache memory;

analyzing the plurality of headline tokens and the plurality of story tokens held in the cache memory to determine if one or more of the news stories are related to the breaking news headline;

mapping one or more of the news stories related to the breaking news headline based on the analysis, wherein the mapping establishes relationship between the related one or more news stories and the breaking news headline, the mapping being maintained in the cache memory; and presenting, on a display device, the related one or more news stories received from one or more of the content providers alongside the breaking news headline based on the mapping in response to the receipt of the breaking news, wherein each operation is performed by a processor.

2. The method of claim 1, wherein tokenizing the breaking news headline and the news stories include, identifying keywords that substantially describe the breaking news headline and each one of the news stories, the keywords defining tokens for the respective one of the breaking news headline and the news stories.

3. The method of claim 1, wherein analyzing the plurality of headline tokens and the story tokens further includes, comparing the headline tokens associated with the breaking news headline with the story tokens associated with each of the news stories; and identifying news stories with story tokens that match the headline tokens based on a pre-defined matching criteria, the pre-defined matching criteria establishing matching requirements.

4. The method of claim 3, wherein the pre-defined matching criteria defines a minimal percentage of story tokens of each news story that has to match with the headline tokens of the breaking news headline.

5. The method of claim 3, wherein the pre-defined matching criteria establishes a time frame for reporting the breaking news headlines and each of the news stories received from the content provider.

6. The method of claim 5, wherein analyzing the plurality of headline tokens and the story tokens further includes, identifying a time period when the breaking news headline is received from the content provider;

identifying the time period when each of the identified news stories with story tokens that match the headline tokens, is received from each of the plurality of content providers; and filtering the identified news stories to select a sub-set of the news stories, wherein the selection of the sub-set of news stories is based on the time frame for reporting the breaking news headline established in the pre-defined matching criteria.

7. The method of claim 6, wherein mapping one or more of the news stories further includes, providing a link between the breaking news headline and each one of the identified news stories within the selected sub-set of the news stories, the link establishing a relationship between the breaking news headline and each one of the identified news stories, wherein the link is established by tagging the breaking news headline with an identifier of respective news stories.

8. The method of claim 7, wherein mapping one or more of the news stories further includes, when more than one news story is selected in the sub-set of the news stories, establishing a link between each one of the news stories and other news stories within the sub-set of the news stories, the link establishing a relationship amongst the news stories within the sub-set of the news stories, wherein the link is established by tagging each one of the news stories with the corresponding identifier of each of the other news stories within the sub-set of the news stories.

9. The method of claim 1 further includes, receiving a second breaking news headline from a content provider;

initializing the headline tokens and story tokens; and generating a new set of headline tokens for the second breaking news headline, the new set of headline tokens used in establishing relationship with news stories received from the plurality of content providers.

10. The method of claim 1, wherein the content provider providing at least one of the news stories is same as the content provider providing the breaking news headline, wherein the content provider uses distinct channels to transmit the breaking news headline and the news stories.

11. The method of claim 10, wherein when a particular content provider provides a plurality of news stories related to the breaking news headline, each of the plurality of the news stories is kept distinct and tokenized to generate distinct story tokens for matching with the headline tokens of the breaking news headline.

12. The method of claim 1, wherein the content provider providing the breaking news headline is different from the plurality of content providers that provide the news stories.

13. The method of claim 1 further includes, maintaining the breaking news headline and the news stories in a cache memory of the computing device so as to enable quick retrieval of the breaking news headline and the news stories for dynamic tokenization, matching and presentation of the breaking news headline and the news stories related to the breaking news headline in substantial real time.

14. A computer program embedded in a non-transitory computer-readable storage medium configured to be executed by one or more processors, for relating breaking news stories across content providers, the computer program comprising:

program instructions for receiving a breaking news headline for a breaking news from a content provider;

program instructions for tokenizing the breaking news headline in substantial real time by identifying a plurality of headline tokens;

program instructions for receiving news stories from a plurality of content providers;

program instructions for processing a title of each of the news stories in substantial real time to produce a plurality of story tokens;

program instructions for maintaining the plurality of headline tokens and the plurality of story tokens in a cache memory;

program instructions for analyzing the plurality of headline tokens and the plurality of story tokens held in the cache memory to determine if one or more of the news stories are related to the breaking news headline; and program instructions for mapping one or more of the news stories to the breaking news headline based on the analysis, wherein the mapping establishes relationship between the related one or more news stories and the breaking news headline, the mapping being maintained in the cache memory, the mapping enabling presentation of the one or more news stories from one or more of the content providers for the breaking news headline.

15. The computer program of claim 14, wherein the breaking news headline and the related news stories are stored in a temporary cache memory for quick retrieval, the temporary cache memory further storing the headline tokens related to the breaking news headline and story tokens related to the news stories received from the plurality of content providers.

16. The computer program of claim 14, wherein the computer program for analyzing the plurality of headline tokens and the story tokens further includes, program instructions for comparing the headline tokens associated with the breaking news headline with the story tokens associated with each of the news stories; and program instructions for identifying news stories with story tokens that match the headline tokens based on a pre-defined matching criteria, the pre-defined matching criteria establishing matching requirements.

17. The computer program of claim 16, wherein the computer program for mapping one or more of the news stories further includes, program instructions for providing a link between the breaking news headline and each one of the identified news stories with story tokens that match the headline tokens of the breaking news headline, the link establishing a relationship between the breaking news headline and each one of the identified news stories, wherein the link is established by tagging the breaking news headline with identifiers associated with identified news stories; and program instructions for establishing a link between each one of the news stories and other news stories that are related to the breaking news headline, the link establishing a relationship amongst the identified news stories, wherein the link is established by tagging each one of the news stories with the identifiers of the other news stories related to the breaking news headline.

* * * * *